United States Patent
Lackinger et al.

(10) Patent No.: US 7,575,047 B2
(45) Date of Patent: Aug. 18, 2009

(54) HEATING AND WARM WATER SUPPLY UNIT AND METHOD FOR OPERATING THE SAME

(75) Inventors: Dietmar Lackinger, Kasten (AT);
Harald Neumüller, Pottenstein (AT);
Karl-Heinz Hinrichs,
Ramsau/Dachstein (AT)

(73) Assignee: PREFA-Aluminiumprodukte GmbH,
Marktl/Lilienfeld (AT)

( * ) Notice: Subject to any disclaimer, the term of this patent is extended or adjusted under 35 U.S.C. 154(b) by 413 days.

(21) Appl. No.: 11/357,114

(22) Filed: Feb. 21, 2006

(65) Prior Publication Data
US 2006/0159154 A1    Jul. 20, 2006

Related U.S. Application Data

(63) Continuation of application No. PCT/AT2005/000143, filed on Apr. 27, 2005.

(30) Foreign Application Priority Data
Apr. 28, 2004  (AT) .............................. A 734/2004

(51) Int. Cl.
*F24F 11/06*    (2006.01)
(52) U.S. Cl. .......................... 165/247; 165/47
(58) Field of Classification Search .............. 165/244, 165/247, 45, 47, 48.1, 48.2; 62/235.1
See application file for complete search history.

(56) References Cited

U.S. PATENT DOCUMENTS
2,660,863 A    12/1953  Gerhart, Jr.
(Continued)

FOREIGN PATENT DOCUMENTS
DE          28 36 436         3/1980
(Continued)

OTHER PUBLICATIONS
PREFA-Solar pamphlet (Cited in Specification).
(Continued)

*Primary Examiner*—Ljiljana (Lil) V Ciric
(74) *Attorney, Agent, or Firm*—Buchanan Ingersoll & Rooney PC (57) ABSTRACT

A heat exchanger is disclosed which is built up of a series of segments, which have each a fore-run and a return collector, which are interconnected by tubular or plate-shaped, substantially parallel, heat exchanging elements, in contact with cistern water through which flows the cooling medium of the heat pump. Adjacent heat exchanging segments have flow through in a reversed direction, and the fore-run and return collectors of adjacent segments are directly side by side. An electronic control unit which controls the pump and, optional valves, as a function of signals of temperature sensors on the roof surface, is included in the cistern and/or in conduits, so that during normal operation water is fed from the cistern onto the roof, is heated, and may be returned to the cistern. In times of the risk of icing of the water in the distribution pipes and on the roofing the pump and the valves are controlled in such a manner that feeding water to the roof is interrupted, and the distribution pipes, and optionally their feeding pipes, are drained off, while the pump can take care of a circulation of water in the cistern, so that the heat capacity of the water of the cistern, including at least part of the latent heat thereof, and optionally the geothermal energy fed through the cistern's wall, may be utilized.

54 Claims, 6 Drawing Sheets

U.S. PATENT DOCUMENTS

| | | | | |
|---|---|---|---|---|
| 3,991,938 | A * | 11/1976 | Ramey | 62/235.1 |
| 4,011,731 | A * | 3/1977 | Meckler | 62/235.1 |
| 4,052,975 | A | 10/1977 | Ceideburg | |
| 4,289,116 | A | 9/1981 | Williams | |
| 4,340,036 | A | 7/1982 | Williams | |
| 4,485,802 | A * | 12/1984 | Babcock | 126/563 |
| 6,941,702 | B1 * | 9/2005 | Abrams et al. | 52/16 |

FOREIGN PATENT DOCUMENTS

| | | |
|---|---|---|
| DE | 32 30 371 C1 | 8/1982 |
| DE | 33 10 228 A1 | 9/1984 |
| DE | 44 05 991 C1 | 2/1994 |
| DE | 295 07 178 U1 | 10/1996 |
| DE | 101 39 065 A1 | 2/2003 |
| EP | 0 031 942 A1 | 7/1981 |
| FR | 2 566 032 | 12/1985 |

OTHER PUBLICATIONS

H•I•T solar 21 pamphlet.
Solartec 21 The Power of Nature pamphlet.

* cited by examiner

HEATING AND WARM WATER SUPPLY UNIT AND METHOD FOR OPERATING THE SAME

RELATED APPLICATIONS

The present application is a continuation application which claims the benefit of the filing date of PCT/AT2005/000143, filed Apr. 27, 2005, under 35 U.S.C. §120, and claims priority under 35 U.S.C. §119 to A734/2004, filed in Austria on Apr. 28, 2004, the contents of which are hereby incorporated by reference in their entireties.

FIELD

Heating and/or warm water supply unit is disclosed which comprises a device for heating water under the influence of ambient energy, the water being storable in a container, for example a rain water cistern or the like. The supply unit includes a heat pump, a first external cooling medium circuit including a heat exchanger supplied by water of a rain water cistern or the like, in which heat exchanger cool medium coming from the heat pump is heated and is returned to the heat pump, wherein, in the case of a cistern sunk into the soil, the cistern water absorbs heat from the ambient soil by a heat exchange through the cistern's wall, thus heating the water again. A pump is provided by which water from the cistern may be fed to a roof, where it may be distributed, particularly equally, in the upper region of the roof surface, while water, flowing over the roofing, may be collected in eaves gutters to be returned to the cistern.

The term "ambient energy", as used above, encompasses energy of a variety of sources: first the energy of direct sun radiation, but also energy of a diffused radiation, heat supply by warm ambient air, the heat transition being possibly enhanced by wind, and finally also heat which escapes through the roof due to a not quite perfect heat insulation of a house.

BACKGROUND

Heat pumps are a particularly elegant and energy saving installation for low temperature and warm water providing units. They are capable of pumping heat from a low temperature level, e.g. well water of 10° C. for example, up to a temperature of 30-50° C. According to the parameters of such a unit, performance numbers of up to 6 may be achieved. (The performance number indicates how much the heat power of the unit is greater in comparison to the electrical power supplied). Efficient so-called water/water-heat pumps, however, can involve the supply of not inconsiderable quantities of water obtained from wells. The water, that has been cooled in the heat pump, has subsequently to be fed to the groundwater via absorption wells. This will, in general, not only result in extremely high investments, but is refused to an increasing extent by the authorities in view of the risk of a groundwater pollution.

Another method is to withdraw heat from ambient air. Such installations involve a very high throughput of air, which can lead to rather modest performance numbers and to emission of noise. Typically, icing of the heat exchangers will occur in winter time which requires regular defrosting and which further reduces the average performance number.

In order to solve the problems of high water consumption in water/water installations and, at the same time, to improve the performance number, a variant to the known systems has been suggested in DE 101 39 065 A1. According to this publication, a solar collector mounted on a roof is provided which is connected to a water reservoir, the heated water of which is heating the evaporator of a heat pump, while the latter pumps the heat supplied onto a higher temperature level.

Devices of this kind have, in practice, shown not to be without problems:

Although some improvement was possible by this solution, the environmental problem is still present, though with a different argumentation: to avoid icing of the system, particularly of the solar collector in winter time, the water in this circuit is provided with an anti-freezer, e.g. glycol or with sodium chloride. In case there is some leakage in the system, a relative large quantity of water contaminated with the anti-freezer can emerge and may finally reach the groundwater.

This is the reason why the authorities refuse to an increasing extent to approve such installations, not only in preservation regions of groundwater, but also in many other regions of an ambient worthwhile to be protected.

A further reason, which can deter home-owners and potential installers from such installations, is, on the one hand, the unfavorable appearance: the absorbers, consisting either of glass enclosed boxes which surround the proper collectors, or of a black plastic material, are mounted on the roofing and contrast, in general, very much to the roofing that consists of roofing stones or tiles, or of color coated aluminum plates so that the appearance of a house having such an installation is much affected from an aesthetic point of view. In view of the relative high prize of such collectors, but also for aesthetic reasons, one therefore tries to do with a minimum collector surface, which, however, results in a low performance number of the heat pump over the annual average.

It has also been suggested to utilize the temperature rise of roofs by irrigating it with water and to introduce the water, thus heated, into a cistern. Cistern water is fed by a pump through a heat exchanger to the distributing pipes on the roof's surfaces. Such installations are described, for example, in the German Patent Application DE 33 10 228 and in the French Patent Application FR 2 566 032. Similar installations are subject matter of the U.S. Pat. No. 4,340,036, the U.S. Pat. No. 4,052,975 and the U.S. Pat. No. 2,660,863. Installations of this type work as long as the cistern water has a temperature clearly above 0° C. However, problems can appear when the temperature of the cistern water drops down to the range of 0° C. For example, weather conditions can occur in the months of January and February in many regions of Central Europe where, due to fog, a temperature rise of the roof's surface by direct and, to a wide extent also by indirect, radiation fails to appear, while the air temperature is below 0° C. With such weather conditions, the need of heat can be great, but cannot be covered, or only be partially covered, by the above-mentioned installations so that one has to fall back to an additional heating which is, in general, an electrical heating. Then, the performance number of the installation is in the range of 1 and leads to worsening of the annual performance number that can be decisive for judging the efficiency of the heating installation.

In the arrangement of the heat exchanger, as is illustrated, for example, in DE 33 10 228, such temperatures result in icing of the heat exchanger, beginning at the feeding conduit for the brine which has been cooled down in the heat pump to, for example, −4° C. Such icing can be unavoidable when utilizing the latent heat of the water, but the formation of large and massive volumes of ice can be avoided.

The contents of all documents mentioned herein, and throughout the application, are incorporated herein by reference in their entireties.

SUMMARY

Ice layers can be generated on a heat exchanger of a relatively large surface area, which have, in turn, a large surface area. Worsening of the heat transition due to the ice layers can be compensated by dimensioning the heat exchanger correspondingly in a more generous manner. Under unfavorable weather conditions, which in the course of a year appear relative seldom, a short-term reduction of the momentary value of the performance number of an installation can occur. But it is substantial that immediately after introduction of some warmer water into the cistern, the ice layers are quickly defrosted so that the momentary performance number is increased again. Thus, icing of the heat exchanger, which appears in some cases when utilizing the latent heat, remains without a remarkable influence onto the annual performance number of an installation, which is decisive for an economic operation.

According to an exemplary embodiment of the invention, a heat exchanger is built up of a series of segments, which have each a fore-run and a return collector, which are interconnected by tubular or plate-shaped, substantially parallel, heat exchanging elements, in contact with cistern water through which flows the cooling medium of the heat pump. Adjacent heat exchanging segments have flow through in a reversed direction, and the fore-run and return collectors of adjacent segments are directly side by side. An electronic control unit which controls the pump and, optional valves, as a function of signals of temperature sensors on the roof surface, is included in the cistern and/or in conduits, so that during normal operation water is fed from the cistern onto the roof, is heated, and may be returned to the cistern. In times of the risk of icing of the water in the distribution pipes and on the roofing the pump and the valves are controlled in such a manner that feeding water to the roof is interrupted, and the distribution pipes, and optionally their feeding pipes, are drained off, while the pump can take care of a circulation of water in the cistern, so that the heat capacity of the water of the cistern, including at least part of the latent heat thereof, and optionally the geothermal energy fed through the cistern's wall, may be utilized.

Such a solution involves only small investments so that, in general, the whole roof surface may be used for heating the secondary water, but at least those surfaces, the orientation of which results in a high irradiation (e.g., Eastern, Southern or Western side). A further advantage of this solution is that the roof need not be optically affected by using solar energy, because the roofing itself is used as a heat source, and because, in a further advantageous embodiment of the invention, the distribution pipes for a uniform irrigation of the roofing may be situated in a hidden manner in ridge shrouds.

In relation to environmental aspects, advantages exist. For example, pure water, particularly rain water, can be used to fill the cistern so that, even in the case of a leakage of the system, the environment is not burdened, and above all groundwater is not polluted. Therefore, it may even be accepted to introduce the overflow of the cistern into the groundwater.

In accordance with an alternative to the above-mentioned subject matter, the heat exchanger can be formed as a crosscurrent heat exchanger, which may have a medium flowing through from the evaporator circuit of the heat pump, on the one hand, and cistern water flowing through on the other hand. The cooled cistern water exiting the heat exchanger is fed to the distribution pipes on the roof via a valve, and is finely distributed over the roof surface area. Between the feeding conduit to the distribution pipes and the cistern, a connection conduit including a valve is provided, which orifices into the feeding conduit to the distribution pipes before the valve. Furthermore, the installation can comprise a, particularly electronic, control unit which controls the pump and the valves, as a function of signals of temperature sensors on the roof surface, in the cistern and/or in the conduits, so that during normal operation water is fed from the cistern onto the roof, is heated there and may be returned to the cistern. In times of the risk of icing of the distribution pipes or of the roofing, the pump and the valves can be controlled in such a manner that the cistern water cooled down in the crosscurrent heat exchanger may immediately be returned via the opened valve into the cistern so that the heat capacity of the water of the cistern, including at least part of the latent heat thereof, and optionally the geothermal energy fed through the cistern wall, may be utilized. Ice crystals forming when exploiting the latent heat of the water can be flushed into the cistern by the stream within the heat exchanger, and an ice formation in the crosscurrent heat exchanger can be prevented.

Further advantages are achieved when the roofing includes (e.g., consists of) sheet metal, preferably of aluminum sheet. By applying a surface coating, a high absorption capacity in the visible and the infrared rang of the spectrum may be obtained.

An exemplary method for operating a heating and hot water supply unit comprising a water container, particularly a cistern, is also described, which is first filled with water, particularly rain water. By a heat exchanger, in which cold brine or the like coming from a heat pump is warmed up, heat is detracted from this water. In normal operation the water of the container is fed, optionally periodically, by a pump or the like to a roof, and is subsequently finely distributed on it, the water warmed up on the roofing being collected in an eaves gutter and being returned to the water container.

According to an exemplary embodiment, in the case of a risk of icing of the water, particularly with roofing temperatures of less than 1° C., the distribution pipes and the feeding pipes can be drained off and locked by closing the valves. In this operational condition, the heat capacity of the water of the cistern, including at least part of the latent heat thereof, and in case of a cistern sunk into the ground, the heat fed to the cistern by geothermal heat may be utilized for warming up the brine or the like of the heat pump. By an appropriate control of the pump and of the valves, mixing of the water in the cistern can be achieved so that local under-cooling thereof may be avoided to a large extent. Advantageously, the feed pump is switched on during summer operation, particularly with the heat pump being switched off, so that the cooler cistern water, which runs over the roofing, effects cooling of the roof both directly and, in addition, by evaporation, while in the case of a cistern sunk into the ground the ambient soil is heated by the relative warm cistern water, which, in heat pump operation, puts additional heat at the disposal for partially heating the cistern water. The roofing, as much as possible, can be kept free from snow, because due to the thermal insulating effect of snow no heat can be transferred from ambient to the roof. In order to avoid this, the irrigation of the roof surface can be switched on either by a snow sensor or by a switch, particularly a manually actuated one, so that, in the case of a snow layer or of snow fall, the snow may be instantly defrosted, thus freeing the roof from snow. Defrosting the snow may, however, be effected also in any other suitable way, such as by heating cables, as they are used for defrosting eaves gutters.

BRIEF DESCRIPTION OF THE DRAWINGS

Further characteristics will become apparent from the following description of exemplary embodiments with reference to the drawings, wherein.

DETAILED DESCRIPTION

Figure 1:
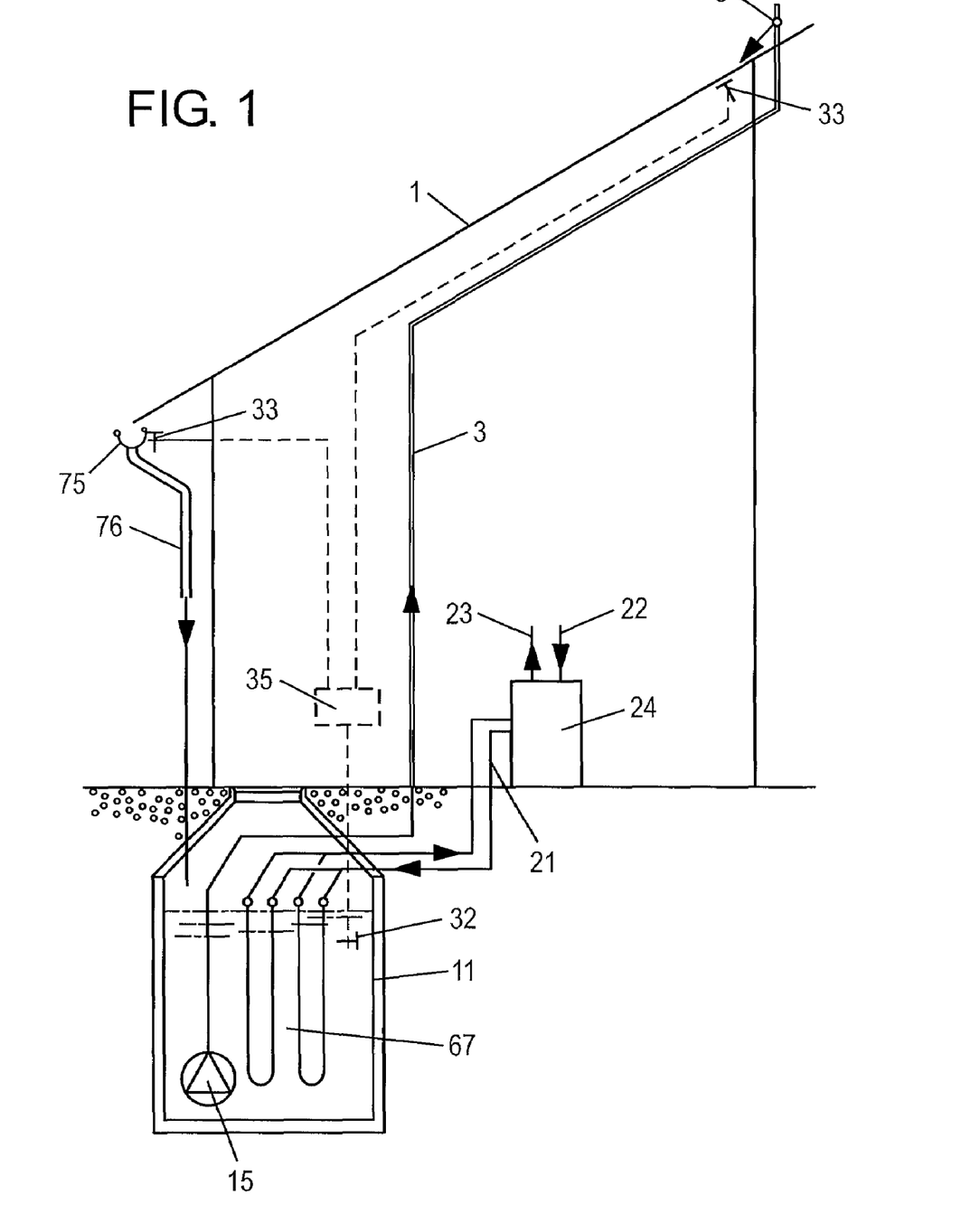
FIG. 1 shows schematically an exemplary installation according to the invention.
Figure 6:
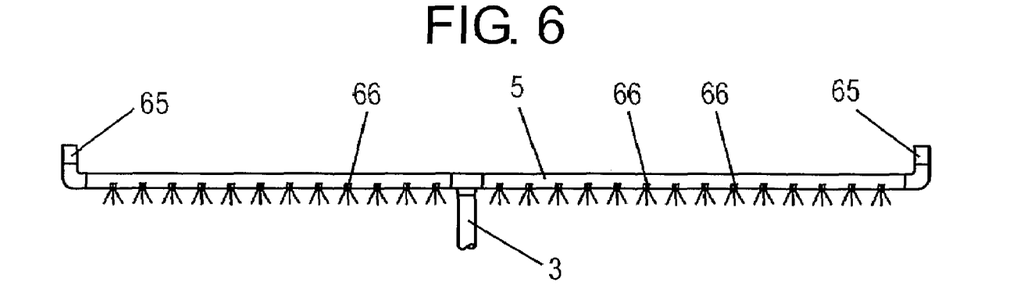
FIGS. 6 and 7a, 7b show different exemplary embodiments of distribution pipes.

FIG. 1 shows schematically an exemplary heating and warm water supply unit, for example for a one-family house. The house has a shed roof comprising a roofing at the side 1 facing the sun (e.g., Southern or Western side). In the upper part of the roof, a water distribution pipe 5 is arranged. Such a pipe 5 is illustrated in detail in FIG. 6. The distribution pipe is of stainless steel or of a plastic material and has at each of the ends opposite the feeding pipe 3 a vertically upwards directed pipe socket 65. At the lower side, the distribution pipe 5 comprises a series of small bores 66 through which water is uniformly distributed over the roof surface. The two branches of the distribution pipe 5 may have a small ascent towards the pipe socket 65. The pressure of the feeding pump 15 is adjusted in such a manner that the water level within the two pipe sockets 65 is about at half height. Therefore, water exits with a small, defined pressure along the whole pipe 5 from the bores 66. When the pump is switched off, the pipe 5 drains completely off so that, in case of frost, no icing of it can occur. A further exemplary advantage of this arrangement is that the alignment of the distribution pipes on the roof is relatively uncritical. The feeding pressure may optionally be adjusted using appropriate flow throttles.

Water flowing over the roof surface is collected in an eaves gutter 7a. Water is fed to a cistern 11 by rain pipes 7b. This cistern is filled with rain water, and when starting the operation of the installation it can, in general, be filled, at least in part, with water of a conduit either for water for industrial use or for drinking water. In the cistern 11, a schematically illustrated heat exchanger 67 is located. Through this exchanger circulates brine (or any other appropriate frost resisting medium) of a heat pump 24, whose consumer's extension circuit is designated 22 and 23. (Details of such a heat pump are described in the following in detail with reference to FIG. 8). The brine, cooled down in the evaporator of the heat pump, which exits from the heat pump at 21, is pumped through the heat exchanger 67 by a circulation pump. As is illustrated particularly in FIGS. 2a to 2c, the heat exchanger 67 is built up by two segments or modules which include (e.g., consist on a plurality of heat exchanging elements 70. Each of these heat exchanging elements comprises a fore-run collector 71 that is interlinked with a return collector 72 by a series of pipes 68 parallel to each other. Pipes 68 are curved into a U-shape so that the pipes leading to the return collectors 72 are situated between adjacent series of pipes which emerge from the fore-run collectors 71. If the cistern water has cooled down to a temperature near to the freezing point, which will particularly be the case when utilizing the latent heat of the cistern's water, ice layers will form on the series of pipes near the intake collectors 71 where the brine has the deepest temperature. Icing will advance continuously along the pipes 68. The regions near the return collectors 72 are the longest which are ice-free. By this measure, it can be ensured that no massive ice block will form on the collectors that could be defrosted again only with difficulties due to its relative small surface area. The ice layers adhering to the bundles of pipes will have a relatively rather large surface area and are able to be quickly defrosted as soon as they are in contact with somewhat warmer water, by which the performance number of the installation can be improved again. The total surface area of the heat exchanging pipes 68 is dimensioned in such a manner that an acceptable performance number of the installation can still be attained even with moderate icing of them (e.g., ice thickness of <5-6 mm). With such dimensioning, the heat transition is primarily determined by the heat conductivity of the ice layer and rather less by that of the material of the pipes. Therefore, plastic materials, such as polypropylene or polyethylene, are also suitable in the present case, apart from the often chosen metallic materials.

If the roofing 1 is warmer than the cistern water, the circulation pump 15 remains operating and pumps water from the cistern onto the roof surface. The pump 15 is controlled by an electronic control unit 35 which receives signals from temperature sensors 33 on the roofing 1 and from such a sensor 32 in the cistern water. For example, if the roof 1, on a winter day, attains a positive temperature in the sun and, thus, is warmer than the cistern water, the pump 15 is switched on by the control unit 35. However, if the roofing temperature is below 0° C. so that icing of the distribution pipe 5, and partially also of the feeding pipe 3, could occur, the pump 15 is switched off. Then, the water in the pipes will flow back through the pump into the cistern.

An exemplary advantage of the installation is that the heat capacity of the cistern water can almost be completely exploited: water cannot only be cooled down to 0° C., one can also exploit, at least partially, the latent heat of water at the transition from the liquid to the solid state of aggregation. Since this latent or melting heat, in the case of water, amounts to 82 kWh/m$^3$, a colossal additional energy potential is at the disposal, considering a typical cistern size of 10-15 m$^3$.

Figure 2A:
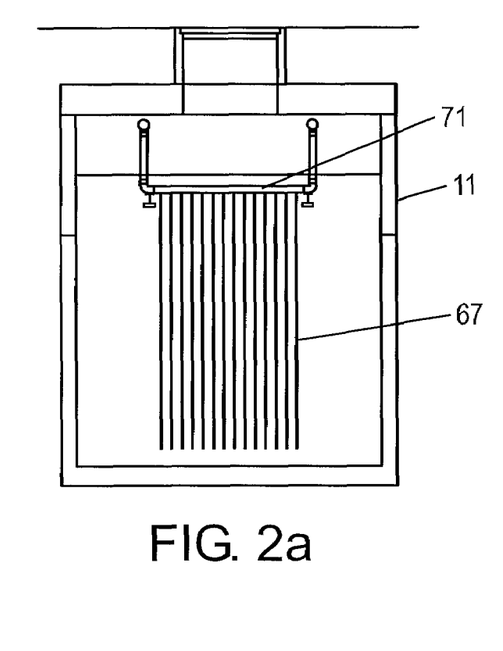
FIGS. 2a to 2c represent different views of a first exemplary embodiment of a heat exchanger.
Figure 2B:
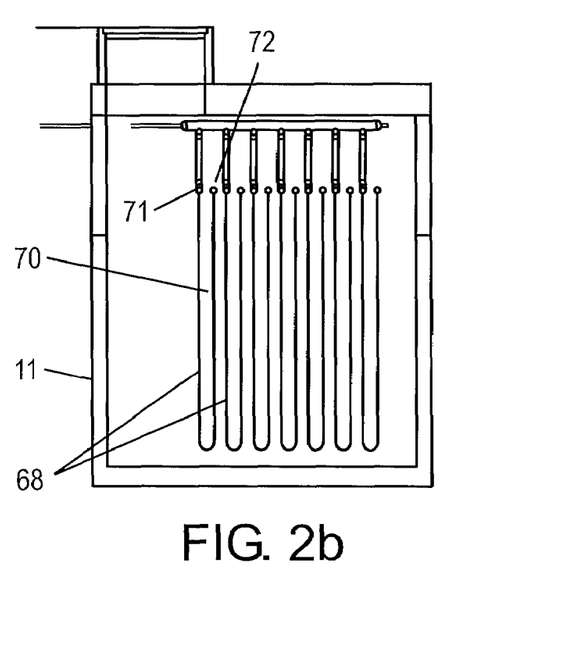
Figure 2C:
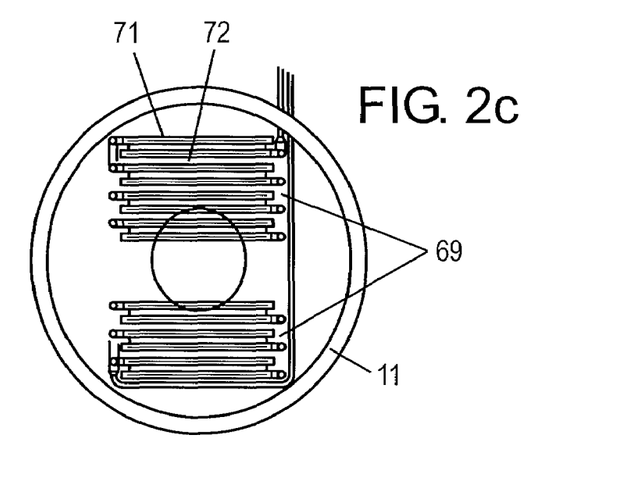
Figure 3:
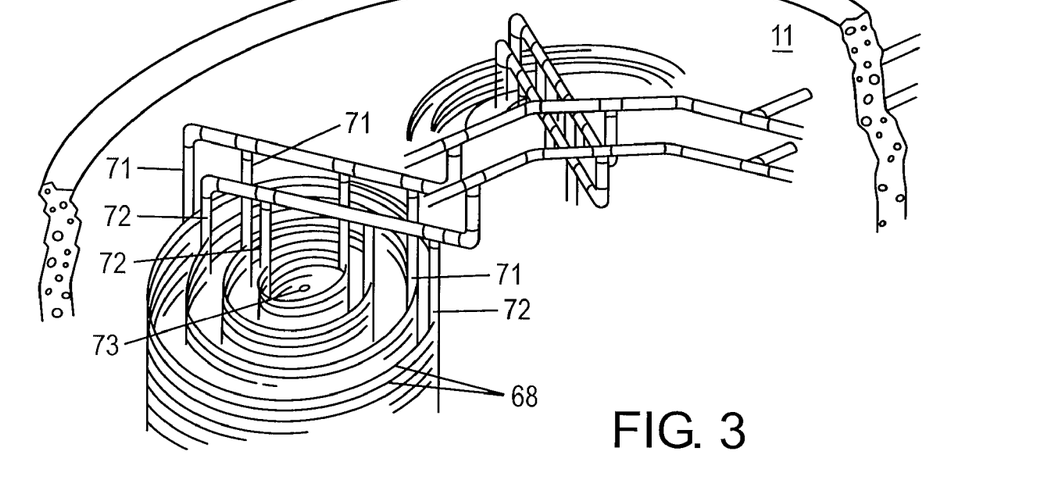
FIGS. 3 and 4 show axonometric representations of variants of exemplary heat exchangers.
Figure 4:
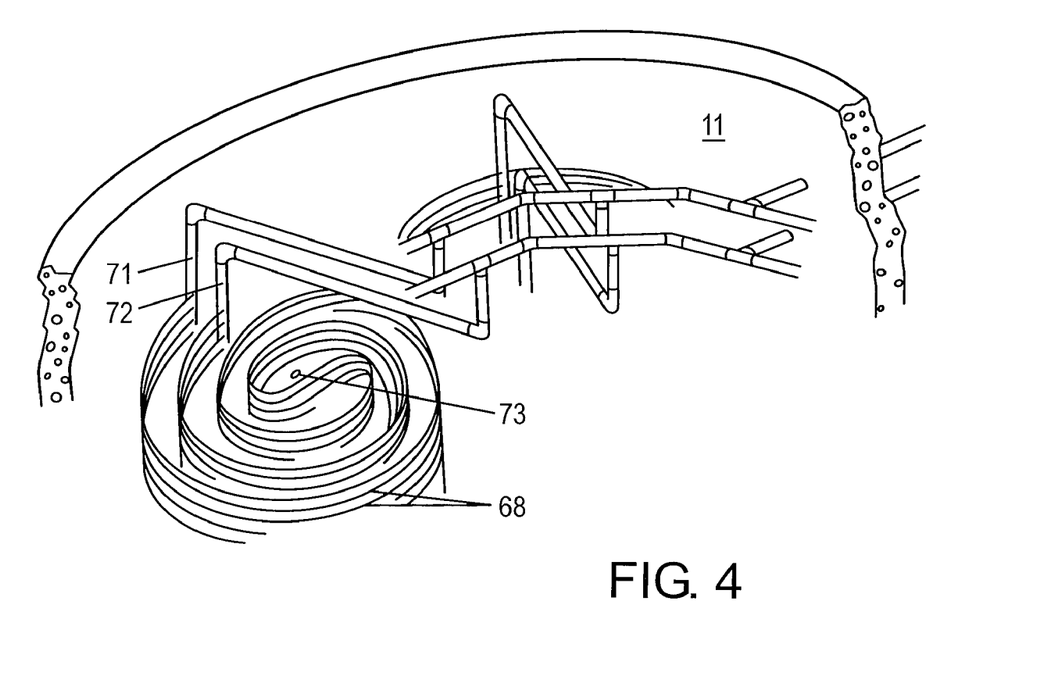
Figure 5:
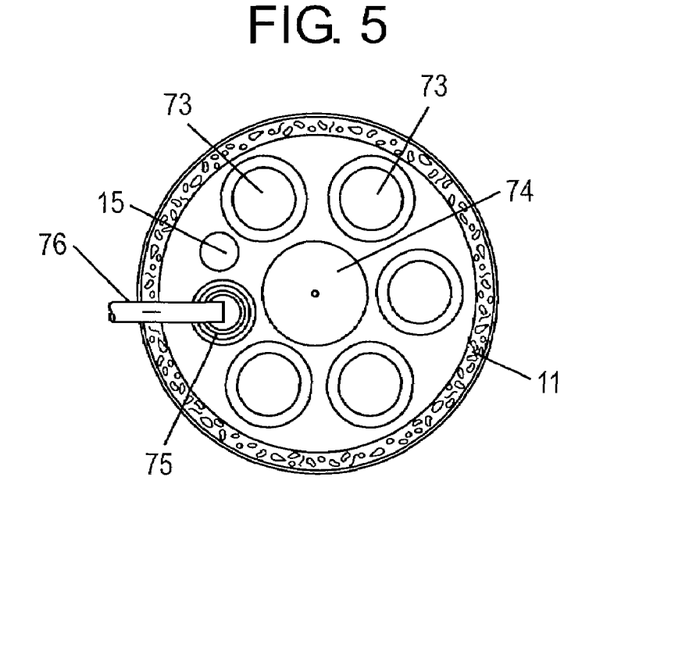
FIG. 5 shows an associated exemplary mounting scheme.

In FIGS. 3 and 4, two different exemplary alternatives to the heat exchanger modules shown in FIGS. 1 and 2 are represented, which, above all, result in a better accessibility during mounting and maintenance works. According to FIG. 3, the pipes 68 are arranged along cylindrical surfaces, and are fed by vertically extending fore-run collectors 71. The return collectors extend also in vertical direction. The position of the pipes 68 is secured by spacers not shown. As is schematically illustrated in FIG. 5, a series of these modules 73 having a vertical axis are built into the cistern. The modules have a diameter smaller than the clear width of a manhole 74 so that they can easily be introduced for mounting. In a sector of the cistern 11, the pump 15, formed as a submerged pump, is located. 7b designates the feed pipe from the roof. 74 designates a filter basket in which pollutions of the water, that comes from the roof, are retained.

In the alternative according to FIG. 4, the modules 73 are spiral-shaped: the pipes, which extend in horizontal direction between the vertical fore-run and return collectors 71 and 72, are first folded into an U-shape and are then spirally wound and secured by spacers. Mounting in the cistern is effected again in accordance with FIG. 5.

Figure 7A:
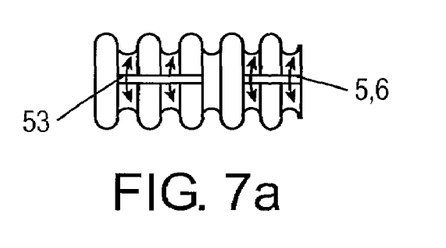
Figure 7B:
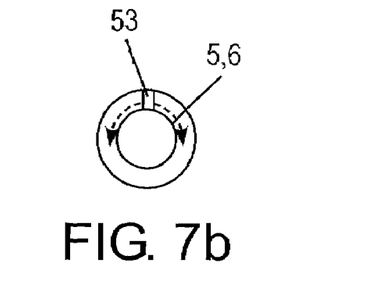
Figure 8:
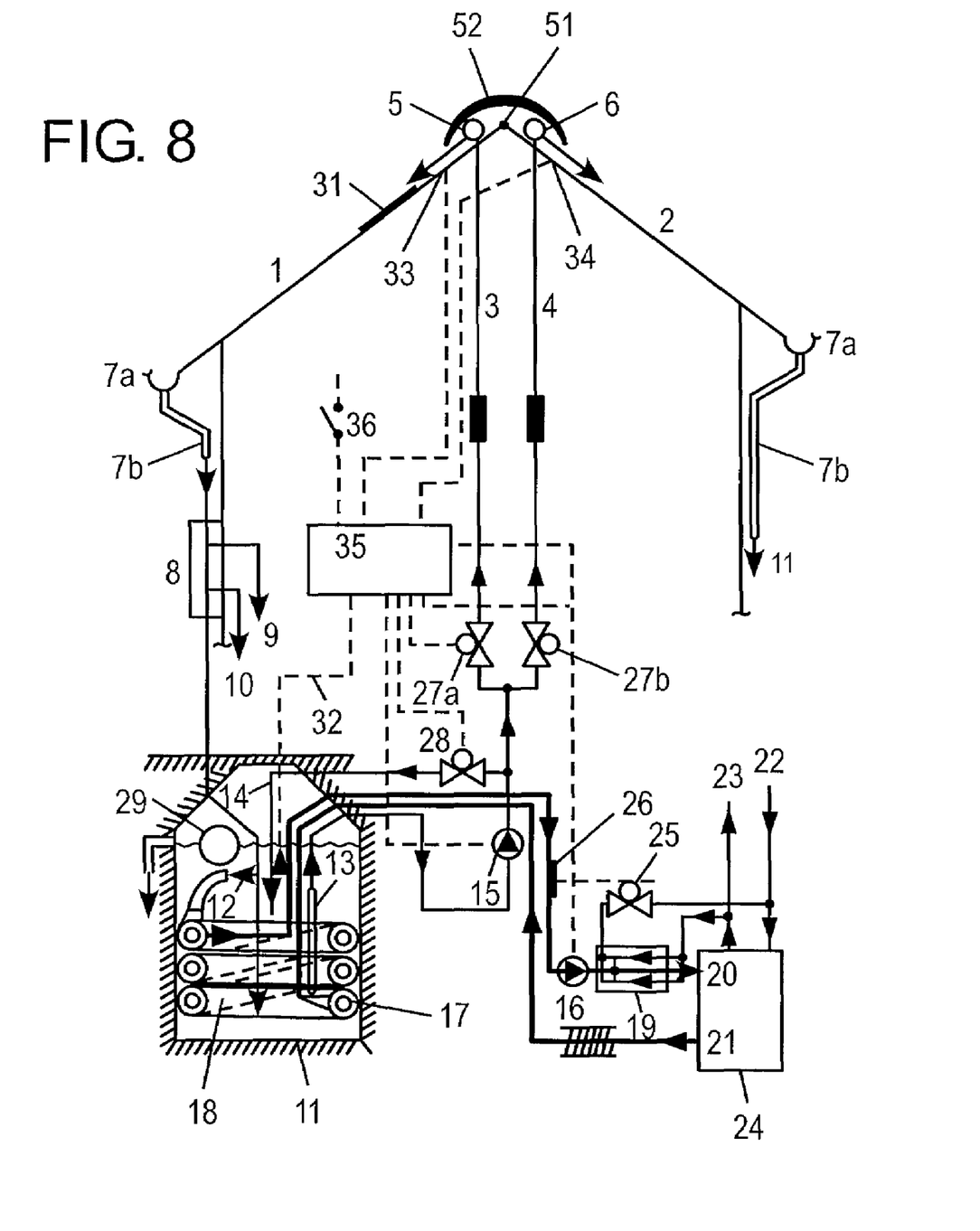
FIG. 8 shows an exemplary variant of the installation according to the invention.

FIG. 8 shows schematically an exemplary alternative heating and warm water supply unit, for example for a one-family house. The house has a roof comprising a roofing at the side 1 facing the sun (e.g., Southern or Western side) and on the side 2 opposed to the sun (e.g., Northern or Eastern side). The ridge 51 of the roof comprises so-called ridge shrouds 52 which surround water distribution pipes 5 and 6. A small portion of these pipes 5, 6 is illustrated in detail in FIGS. 7a and 7b, where FIG. 7a shows part of these pipes in a plan view, while FIG. 7b illustrates a cross-section of such a pipe.

The distribution pipes 5 and 6 can be formed as corrugated pipes of stainless steel or plastic material and are slotted on their upper side or are provided with bores so that water fed through the pipes 5, 6 exits substantially without pressure, and flows finely distributed downwards over the roofing 1, 2 to be finally collected in the eaves gutter 7a. Water is fed to a cistern 11 through rain pipes 7b. A float, arranged in the cistern 11, is designated 29 and controls an overflow valve and/or a water level gauge. In the cistern 11, a crosscurrent heat exchanger 18 is arranged which is coaxially constructed.

Through the inner pipe 17 of the heat exchanger 18 circulates brine (or any other appropriate frost resisting medium) of a heat pump 24. The brine, cooled down in the evaporator (not shown) of the heat pump, which exits from the heat pump at 21, is pumped by a circulation pump 16 through the inner pipe 17 of the heat exchanger. The pipe 17 is jacketed by a coaxial outer pipe, through which rain water from the cistern 11 is sucked by a circulation pump 15. The medium in the inner pipe 17 and that in the space between inner and outer pipe are flowing in opposite directions (crosscurrent heat exchanger 18) and is finally fed to the distribution pipes 5 and 6 through the conduits 3 and 4. The rain water of the secondary circuit may, under certain conditions, assume a temperature of 0° C. at the exit of the heat exchanger 18, and in an extreme case this temperature may even fall insignificantly below. If the heat pump does not operate, but the roofing 1, 2 is warmer than the cistern water, the circulation pump 15 continues working and pumps water from the cistern onto the roof surfaces. The pump 15 is controlled by an electronic control unit 35 which receives signals from temperature sensors 33, 34 on the roofing 1 and 2, and from such a sensor 32 in the cistern water.

For example, if the roof 1, on a cold winter day, is in the sun and attains some positive degrees, while the roof 2 in the shadow is in a frosty temperature range, a motor actuated valve 27b is closed by the control unit 35. If the roofing temperature on both roof halves is in the range of the temperature of the cistern water or below, the pump 15 is stopped so that the pipes 3, 4 and 5, 6 are at least partially drained through the pump 15. If the roofing temperature of both roof halves 1 and 2 is below 0° C. so that icing of the distribution pipes 5, 6 and, partially, also of the feeding pipes 3, 4 might occur, both valves 27a and 27b as well as the draining valve 28 are opened. Thus, the water in the pipes will then flow back into the cistern. When snow falls or when a layer of snow has already accumulated on the roof, the pump 15 may be activated by actuating a manual switch 36. Then, the valve 28 is closed, while the valves 27a, 27b remain open or are brought into open position.

Preferably, the heat pump 24 is switched off during defrosting so that cistern water is pumped onto the roof, and not water that has been cooled by the heat pump. The liquid film, that forms between the roofing and the snow layer, effects defrosting of the snow layer so that the roof surfaces are free again. With a continuous snow fall, defrosting is effected periodically to keep the roof free of snow.

In order to avoid icing of, for example, critical zones within the cistern, further cooling of these zones may be a achieved, if however with a reduced performance number in this case, by a sort of "feed back operation": by a crosscurrent heat exchanger 19 between the high temperature circuit and the low temperature circuit of the heat pump 24, the medium in the low temperature circuit is warmed up. In this operational condition, the heat exchanger 19 is switched as a consumer into the high temperature circuit, and is connected to the warm water feed pipe 23, on the one hand, and to the warm water return pipe 22, on the other hand. A thermostatic valve 25 inserted into the feeding side or the return side to this heat exchanger controls this "feed back" function of the installation. The temperature sensor 26 of the thermostatic valve 25 is mounted to a pipe in the return conduit for the water of the primary circuit. In this primary circuit, a heat exchanger may be provided, which absorbs heat from warm waste water from the kitchen and the bath. In FIG. 8, for the sake of clearer illustration, the warm-water apparatuses for the heating installation (particularly for a low temperature heating installation in the floor, the ceiling and/or the wall) as well as for warm water preparation for bath and kitchen and so on are not shown.

FIG. 8 shows a photo-voltaic panel 31 integrated into the roofing 1, such as is on the market for example by the firm PREFA under the name "PREFA-SOLAR". Such photo-voltaic panels have an efficiency which is dependent on temperature and deteriorates with increasing temperature. By irrigating of the panel with the relative cool cistern water, the panels are cooled, thus increasing their efficiency.

In the rain pipe 7b, a weatherproof distributor 8 is provided by which heat of two different temperature levels may be withdrawn from the rain water of the secondary circuit without using the heat pump 24. The corresponding discharge conduits are designated 9 and 10.

Figure 9:
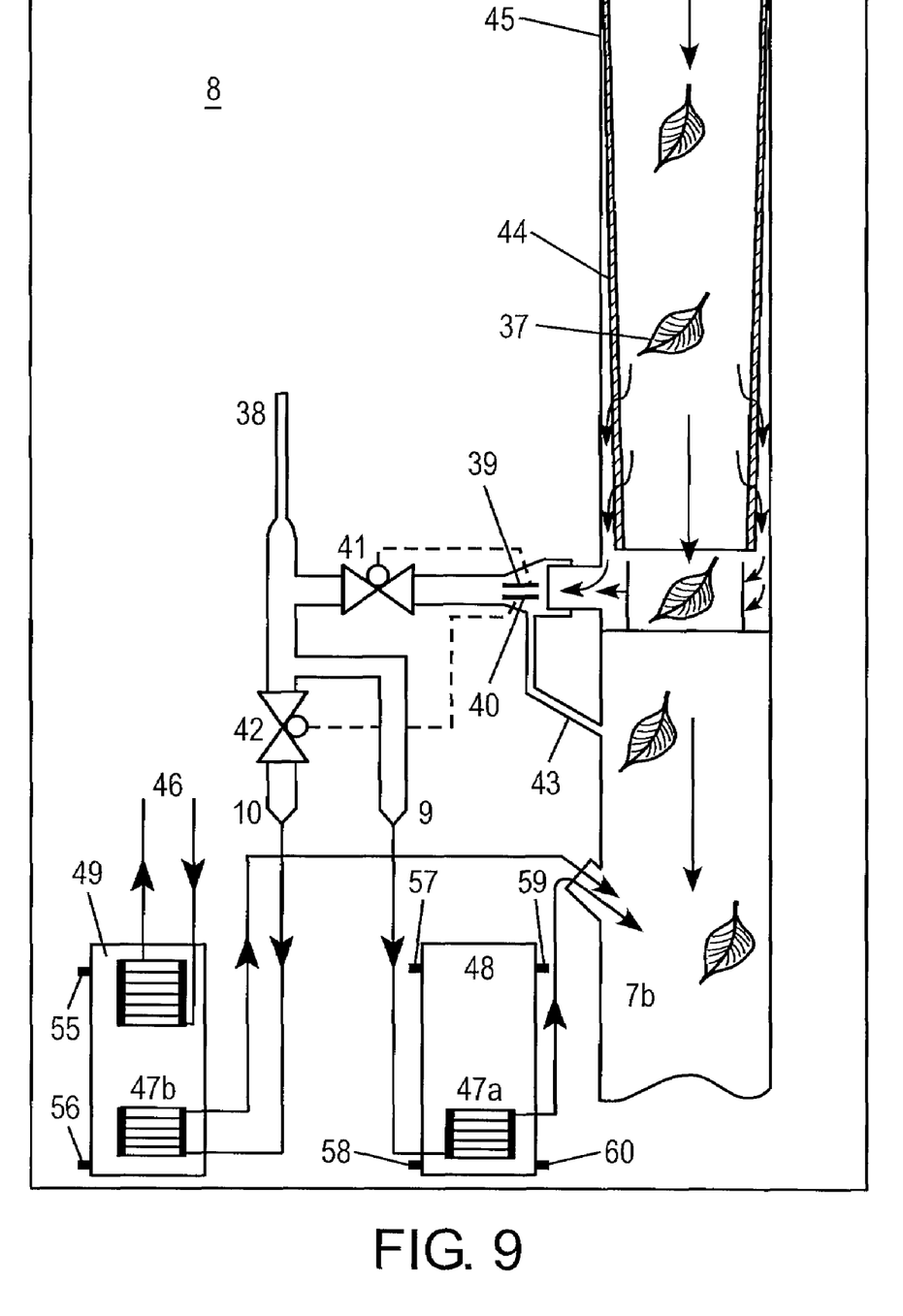
FIG. 9 shows details of the FIG. 8 embodiment.

FIG. 9 shows some details of the distributor 8. A rain water filter of the firm of WISY AG, Haustechniksysteme, which in principle is described in DE 20015675U, is inserted into the rain pipe 7b. This filter is based on the recognition that with a normal water feed, water flows along the pipe's inner wall. A pipe socket 45 connected to the rain pipe 7b directs the water over a conically formed fine filter 44. Clean water passes through this so-called "adhesion filter", is collected in an annular chamber, and is discharged through a connected pipe. Coarse pollutions, such as leaves 37, drop through the central portion of the rain water filter and reach directly the cistern, where they are caught in a filter basket. From the connected pipe, water warmed on the roof reaches a thermostatic valve 41 whose capillary bulb 40 is in contact with water flowing in.

The thermostatic valve 41 is adjusted in such a manner that it opens, for example, at a temperature of 30° C. A further thermostatic valve in the discharge pipe 10 is designated 42, the capillary bulb 40 of which being also arranged in the connected pipe. This valve, however, is adjusted to a higher temperature and opens, for example, only at a temperature of 50° C. Water from the discharge pipe 9, which has at least a temperature of 30° C., is fed to a heat exchanger 47a located in a heat boiler 48, and is finally fed again into the rain pipe 7b. The boiler 48 is connected to the feeding and return conduits 23 and 22 of the heat pump 24 by pipe sockets 57, 58. For heating purposes of low temperature heating systems, such as floor, ceiling and/or wall heating systems, water can be taken through the connections 59 and 60, and may be returned again. If the water, which comes from the roof, reaches a temperature of at least 50° C., the thermostatic valve 42 opens, and water flows through the connected pipe 10 to a heat exchanger 47b which is arranged in a second boiler 49. Water exiting the heat exchanger 47b is returned to the cistern via the rain pipe 7b. On the other hand, the boiler 49 is heated by the heat pump 24. To this end, the boiler 49 is connected to the feeding and return conduits 23, 22 of the heat pump through sockets 55, 56. In the boiler 49, a second heat exchanger 46 is arranged in which potable water is heated. By a by-pass conduit 43, the rain water is drained off. This by-pass ensures also an appropriate water exchange in the region of the connecting pipe to the rain water filter so that the temperature sensors 39, 40 of the thermostatic valves 41, 42 are always fed with freshly supplied water. In FIG. 4, an aerating pipe is designated 38.

In order to heat water for heating purposes and for warm water preparation it can be advantageous not to irrigate the roof surfaces continuously with cistern water, but rather periodically. In this way, the roofing has the possibility to assume a higher temperature again. In a corresponding test installation, the return temperature of the cistern water, reaching 15° C. with a continuous irrigation, could be raised up to 35° C. with a periodical operation wherein, of course, the resulting water quantity was reduced.

The invention is not limited to the example described above, but can be modified in a plurality of aspects without departing from the scope of the invention. Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A heating arrangement for a building built on soil and having a roof, comprising:
   heat pump means including first conduit means forming a primary circuit for distributing a heated medium, and second conduit means forming a secondary circuit for circulating a heat carrier medium;
   water container means including a rain water cistern;
   first heat exchanger means in communication with said water container means, said first heat exchanger means being in communication with said second conduit means for warming up said heat carrier medium cooled in said heat pump means and returning it to said heat pump means, said first heat exchanger means including
   at least two heat exchanging segments, each segment being provided with a fore-run collector and a return collector, adjacent heat exchanging segments configured to have the heat carrier medium flow in reverse direction, and the fore-run and return collectors of adjacent segments being directly side by side;
   pump means for pumping water from said water container means to said roof;
   distributing means for receiving water from said water container means with the aid of said pump means and for distributing said water on said roof to flow over said roof;
   water recollecting means for recollecting water from said roof and for returning it to said water container means;
   at least one temperature sensor means for providing a temperature signal to indicate whether a normal operation is possible, and to indicate when risk of icing is present, said temperature sensor means being arranged in at least one of the following places: on said roof, in said water container means, and in said conduit means;
   control means receiving said temperature signal for controlling said pump means, said control means being programmed so that during normal operation water is fed from said water container means onto said roof, is heated there and is returned to said water container means, and in times where said temperature signal indicates the risk of icing of the water, said pump means are controlled in such a manner that feeding water to the roof is interrupted, and said distribution means are drained off.

2. Heating arrangement as set forth in claim 1, wherein said water container means are sunk into said soil to absorb heat from the ambient soil by heat exchange through said water container means, thus heating water contained in the water container.

3. Heating arrangement as set forth in claim 1, wherein said first water recollecting means comprise at least one eaves gutter below said roof.

4. Heating arrangement as set forth in claim 1, wherein said first heat exchanger means comprise a plurality of heat exchanging elements substantially parallel to each other.

5. Heating arrangement as set forth in claim 1, wherein said first heat exchanger means comprise tubular heat exchanging elements.

6. Heating arrangement as set forth in claim 5, wherein said tubular heat exchanging elements comprise a plurality of pipes folded about at their respective middle so that adjacent portions of said tubular heat exchanging elements are adapted to have the heat carrier medium flow in a reverse direction.

7. Heating arrangement as set forth in claim 5, wherein said tubular heat exchanging elements are of plastic material.

8. Heating arrangement as set forth in claim 5, wherein said tubular heat exchanging elements are of metal.

9. Heating arrangement as set forth in claim 1, wherein said water container means comprise an entrance opening.

10. Heating arrangement as set forth in claim 1, wherein said first heat exchanger means are spirally wound into the form of a cylinder of a predetermined diameter having a longitudinal axis.

11. Heating arrangement as set forth in claim 10, wherein said longitudinal axis is vertical within said water container means.

12. Heating arrangement as set forth in claim 10, wherein said water container means comprise an entrance opening of a predetermined width, said redetermined diameter of said heat exchanger means wound into a cylinder being smaller than said predetermined width.

13. A heating arrangement for a building built on soil and having a roof, comprising:
   heat pump means including
   first conduit means forming a primary circuit for distributing a heated medium, and
   second conduit means forming a secondary circuit for circulating a heat carrier medium;
   water container means including a rain water cistern;
   heat exchanger means in communication with said water container means, said heat exchanger means being in communication with said second conduit means for warming up said heat carrier medium cooled in said heat pump means and returning it to said heat pump means, said heat exchanger means including
   at least two heat exchanging segments, each segment being provided with a fore-run collector and a return collector, adjacent heat exchanging segments being configured to have the heat carrier medium flow in reverse direction, and the fore-run and return collectors of adjacent segments being directly side by side;
   pump means for pumping water from said water container means to said roof;
   distributing means for receiving water from said water container means with the aid of said pump means at a feeding side thereof, and for distributing said water on said roof to flow over said roof, said distributing means comprise distribution pipe means of a predetermined length, said distribution pipe means having a plurality of exit openings for distributing water through said outlet bores;

water recollecting means for recollecting water from said roof and for returning it to said water container means;

at least one temperature sensor means for providing a temperature signal to indicate whether a normal operation is possible, and to indicate when risk of icing is present, said temperature sensor means being arranged in at least one of the following places: on said roof, in said water container means, and in said conduit means;

control means receiving said temperature signal for controlling said pump means, said control means being programmed so that during normal operation water is fed from said water container means onto said roof, is heated there and is returned to said water container means, and in times where said temperature signal indicates the risk of icing of the water, said pump means are controlled in such a manner that feeding water to the roof is interrupted, and said distribution means are drained off.

14. Heating arrangement as set forth in claim 13, wherein said exit openings are substantially equally distributed over the length of said distribution pipe means.

15. Heating arrangement as set forth in claim 13, wherein said distribution pipe means comprise at least one horizontally extending distribution pipe having a plurality of the exit openings arranged along said horizontal distribution pipe to irrigate said roof substantially uniformly.

16. Heating arrangement as set forth in claim 15, wherein said roof comprises a roof ridge, said horizontal distribution pipe extending along said roof ridge.

17. Heating arrangement as set forth in claim 14, wherein said exit openings are on an upper side of said distribution pipe means so that water exits substantially pressure-less.

18. Heating arrangement as set forth in claim 14, wherein said exit openings are on a lower side of said distribution pipe means.

19. Heating arrangement as set forth in claim 13, wherein said distribution pipe means comprise a corrugated pipe.

20. Heating arrangement as set forth in claim 13, wherein said distribution pipe means are of plastic material.

21. Heating arrangement as set forth in claim 13, wherein said distribution pipe means are of metal.

22. Heating arrangement as set forth in claim 21, wherein said distribution pipe means are of a corrosion resistant metal.

23. Heating arrangement as set forth in claim 13, wherein said distribution pipe means comprise at least one distribution pipe having a vertical pipe socket open on its upper side at the end averted from said feeding side.

24. Heating arrangement as set forth in claim 23, wherein said pump means are pressure adjustable pump means, the pressure being adjusted in such a manner that said vertical pipe socket is only partially filled with water.

25. Heating arrangement as set forth in claim 13, wherein said distribution pipe means are mounted on said roof with a small ascent in a direction to the feeding side so that the distribution pipes drain substantially completely during intermissions.

26. Heating arrangement as set forth in claim 13, wherein said roof comprises at least one ridge turret, said distribution pipe means are at least partially integrated into said at least one ridge turret.

27. A heating arrangement for a building built on soil and having a roof, comprising:

heat pump means including first conduit means forming a primary circuit for distributing a heated medium, and second conduit means forming a secondary circuit for circulating a heat carrier medium;

water container means including a rain water cistern;

first heat exchanger means in communication with said water container means, said first heat exchanger means comprising conduit means for communication with said second conduit means for warming up said heat carrier medium cooled in said heat pump means and returning it to said heat pump means, said first heat exchanger means including at least two heat exchanging segments, each segment being provided with a fore-run collector and a return collector, adjacent heat exchanging segments being configured to have the heat carrier medium flow in reverse direction, and the fore-run and return collectors of adjacent segments being directly side by side;

pump means for pumping water from said water container means to said roof;

distributing means for receiving water from said water container means with the aid of said pump means and for distributing said water on said roof to flow over said roof;

water recollecting means including recollecting conduit means for recollecting water from said roof and for returning it to said water container means;

valve means for controlling the flow in at least one of said conduit means;

at least one temperature sensor means for providing a temperature signal at least to indicate whether a normal operation is possible, and to indicate when risk of icing is present, said temperature sensor means being arranged in at least one of the following places: on said roof, in said water container means, and in said conduit means;

control means receiving said temperature signal for controlling said pump means and said valve means as a function of said temperature signal, said control means being programmed so that during normal operation water is fed from said water container means onto said roof, is heated there and is returned to said water container means, and in times where said temperature signal indicates the risk of icing of the water, said pump means and said valve means are controlled in such a manner that feeding water to the roof is interrupted, and said distribution means are drained off.

28. Heating arrangement as set forth in claim 27, comprising:

feeding pipe means for feeding water from said pump means to said distributing means.

29. Heating arrangement as set forth in claim 28, wherein said control means are programmed to drain also said feeding pipe means, when said temperature signal indicates the risk of icing of the water.

30. Heating arrangement as set forth in claim 27, wherein said secondary circuit for circulating a heat carrier medium comprises output conduit means leading to said first heat exchanger means, and return conduit means, said return conduit means including second heat exchanger means for warming up said heat carrier medium, said valve means including a valve for controlling the flow within said secondary circuit and said second heat exchanger means, said at least one temperature sensor means comprising a sensor to provide a temperature signal for controlling said valve.

31. Heating arrangement as set forth in claim 30, wherein said second heat exchanger means comprises a reverse direction flow heat exchanger.

32. Heating arrangement as set forth in claim 30, wherein said second heat exchanger means is connected to said primary circuit via said valve, said valve being configured to open when said temperature signal falls below a given temperature value so as to feed a partial stream of water from said primary circuit of the heat pump to said second heat exchanger.

33. Heating arrangement as set forth in claim 27, comprising:
at least one boiler means for heating the heat carrier medium, and at least third heat exchanger means arranged to heat said heat carrier medium of said boiler means, wherein said valve means comprise at least one valve in said water recollecting means, said at least one temperature sensor means comprising a sensor for sensing the temperature within said water recollecting means to control said valve by its temperature signal when a predetermined switching temperature for said valve is at least attained, so as to open said valve in said water recollecting means independently from operation of said heat pump to guide water of said water recollecting means via said third heat exchanger means into said water container means, when said given switching temperatures of the valve is at least attained, said third heat exchanger means being in contact and surrounded by water of the associated boiler.

34. Heating arrangement as set forth in claim 33, comprising:
rain water filter means in said water recollecting means so as to provide filtered recollected water for said third heat exchanger means via said valve.

35. Heating arrangement as set forth in claim 34, wherein said rain water filter means comprise an adhesion filter.

36. Heating arrangement as set forth in claim 34, wherein said rain water filter means is adapted to allow coarse pollutions to be fed directly into said water container means.

37. A heating arrangement for a building built on soil and having a roof, comprising:
heat pump means including first conduit means forming a primary circuit for distributing a heated medium, and second conduit means forming a secondary circuit for circulating a heat carrier medium;
water container means including a rain water cistern; pump means for pumping water from said water container means to said roof; distributing means for receiving water from said water container means with the aid of said pump means and for distributing said water on said roof to flow over said roof;
feeding pipe means for feeding water from said pump means to said distributing means;
connection conduit means extending between said feeding pipe means and said water container means valve means between said water container means and said distributing means, said valve means including a valve in said connection conduit means which orifices into said feeding pipe means before said valve;
heat exchanger means in communication with said water container means, said heat exchanger means being formed as a reverse direction flow heat exchanger which is in communication with said second conduit means for warming up said heat carrier medium cooled in said heat pump means and returning it to said heat pump means, while heat energy of water from said water container means is used to warm said heat carrier medium, so that cooled water exiting said heat exchanger means is fed to said distribution means via said valve means to be finely distributed over the roof surface area;
water recollecting means for recollecting water from said roof and for returning it to said water container means;
at least one temperature sensor means for providing a temperature signal to indicate whether a normal operation is possible, and to indicate when risk of icing is present, said temperature sensor means being arranged in at least one of the following places: on said roof, in said water container means, and in said conduit means;
control means receiving said temperature signal for controlling said pump means and said valve means, said control means being programmed so that during normal operation water is fed from said water container means onto said roof, is heated there and is returned to said water container means, and in times where said temperature signal indicates the risk of icing of the water, said pump means and said valve means are controlled in such a manner that said valve in said connection conduit means is opened and water after cooling in the reverse direction flow heat exchanger is returned directly into said water container means via said open valve, while feeding water to the roof is interrupted.

38. Heating arrangement as set forth in claim 37, wherein said roof comprises a roofing which consists of sheet metal having a surface coating of high absorption capacity in the visible and in the infrared range of the spectrum.

39. Heating arrangement as set forth in claim 37, wherein said roof comprises at least one integrated photo-voltaic panel to be irrigated, and thus cooled, by water fed via said distribution pipe means.

40. Heating arrangement as set forth in claim 37, wherein said reverse direction flow heat exchanger comprises a coaxial double-walled pipe including an inner pipe and an outer pipe, the inner pipe being connected to said primary circuit and being configured so that water of said second conduit means is fed into an interspace between the inner pipe and the outer pipe.

41. Heating arrangement as set forth in claim 37, wherein said reverse direction flow heat exchanger is immersed into said water container means.

42. A method for operating a heating arrangement having a heating means using ambient heat collected in a heating surface, a heat exchanger means, a heat pump means having a primary and a secondary circuit for heating water, and a water container means for storing warm water, the method comprising:
filling said water container means with water;
heating said secondary circuit of said heat pump by said heat exchanger;
feeding said water during normal operation to said heating surface;
distributing said water on said heating surface,
recollecting said water from said heating surface; and
returning said heated water to said water container means.

43. Method as set forth in claim 42, wherein said heating surface comprises a roof surface.

44. Method as set forth in claim 43, wherein said recollecting step comprises guiding said water through at least one eaves gutter.

45. Method as set forth in claim 42, comprising:
heating said water on its way from said heating surface to said water container means by at least one further heat exchanger.

46. Method as set forth in claim 42, wherein said heat exchanger means comprise a reverse direction flow heat exchanger.

47. Method as set forth in claim 42, wherein said feeding step is effected periodically.

48. A method for operating a heating arrangement having a heating means using ambient heat collected in a heating surface, a heat exchanger means, a heat pump means having a primary and a secondary circuit for heating water, and a water container means for storing warm water, the method comprising:

filling said water container means with water;

heating said secondary circuit of said heat pump by said heat exchanger;

feeding said water during normal operation to said heating surface through a pipe system;

draining said pipe system when a risk of icing of the water is detected;

distributing said water on said heating surface during normal operation;

recollecting said water from said heating surface; and returning said heated water to said water container means.

49. Method as set forth in claim 42, comprising:

measuring the temperature of at least one of said primary and secondary circuits.

50. Method as set forth in claim 49, wherein said risk of icing is determined at a measured temperature of less than 1° C.

51. Method as set forth in claim 42, wherein said water container means are sunk into ground to use geothermal heat.

52. Method as set forth in claim 42, comprising:

cooling said heating surface in a summer operation by effecting said feeding step.

53. Method as set forth in claim 52, comprising:

switching off said heat pump during said summer operation.

54. Method as set forth in claim 42, comprising:

starting said distributing step for defrosting said heating surface.

\* \* \* \* \*